United States Patent [19]

De Giacomoni

[11] Patent Number: 5,820,168
[45] Date of Patent: Oct. 13, 1998

[54] FASTENER DEVICE FOR HOLDING A TUBE JUNCTION MEMBER TO A PLATE THROUGH WHICH IT PASSES VIA AN ASSOCIATED OPENING

[75] Inventor: Jacques De Giacomoni, Amboise, France

[73] Assignee: Bundy, Nazelles Negron, France

[21] Appl. No.: 895,039

[22] Filed: Jul. 16, 1997

[30] Foreign Application Priority Data

Jul. 24, 1996 [FR] France .................................. 96 09291

[51] Int. Cl.⁶ ....................................................... F16L 5/00
[52] U.S. Cl. ........................ 285/192; 285/325; 285/330; 285/420; 248/56
[58] Field of Search ................................ 285/139.1, 192, 285/194, 325, 330, 420, 61, 205; 248/56

[56] References Cited

U.S. PATENT DOCUMENTS

| | | | |
|---|---|---|---|
| 2,078,453 | 4/1937 | Miller | 248/56 |
| 2,365,785 | 12/1944 | Tinnerman | 285/192 X |
| 2,640,672 | 6/1953 | Bedford | 285/194 X |
| 3,366,356 | 1/1968 | Fisher | 248/56 |
| 4,601,448 | 7/1986 | Miyazaki et al. | 248/56 |
| 4,621,839 | 11/1986 | Duell et al. | . |
| 4,967,987 | 11/1990 | Swank | 248/56.1 |
| 5,272,934 | 12/1993 | Chegash et al. | . |
| 5,582,199 | 12/1996 | Schmidt et al. | . |

FOREIGN PATENT DOCUMENTS 1 329 503    9/1973   United Kingdom .

*Primary Examiner*—Dave W. Arola
*Attorney, Agent, or Firm*—Sixbey, Friedman, Leedom & Ferguson, P.C.; Gerald J. Ferguson, Jr.

[57] ABSTRACT

The invention relates to a fastener device for fastening to a support plate, the device being constituted by a rider having a first fork whose two branches define an internal outline designed to co-operate with a polygonal element of a junction member to be held so as to prevent said junction member from rotating, and on the other side a second fork whose two branches can be placed astride an extension portion of the junction member, which branches are bent so as to bear both against the other face of the support plate and against a terminal shoulder of the extension portion so as to urge the junction member against the stop face of the plate, thereby holding said junction member against translation.

9 Claims, 3 Drawing Sheets

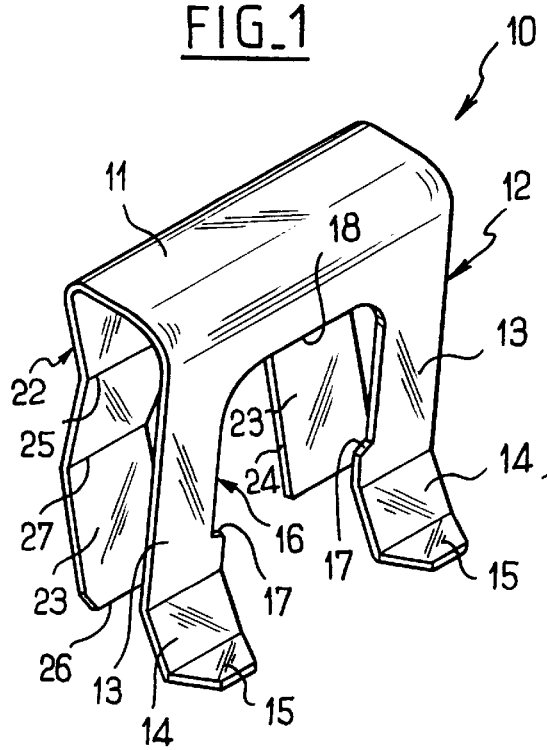
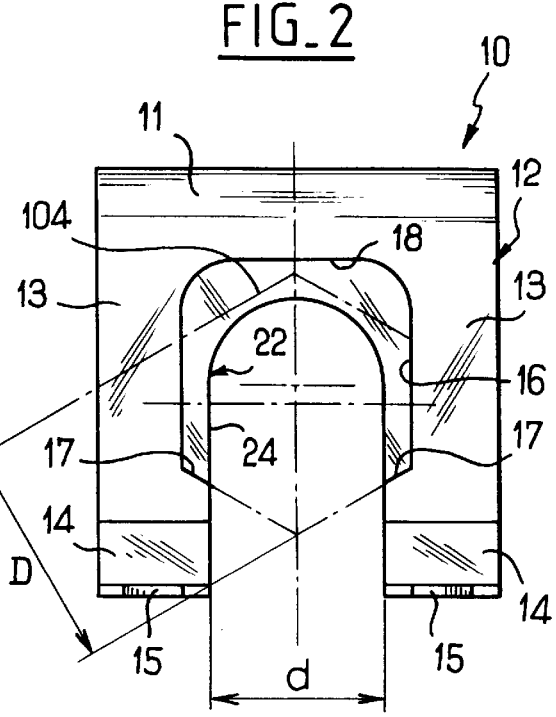
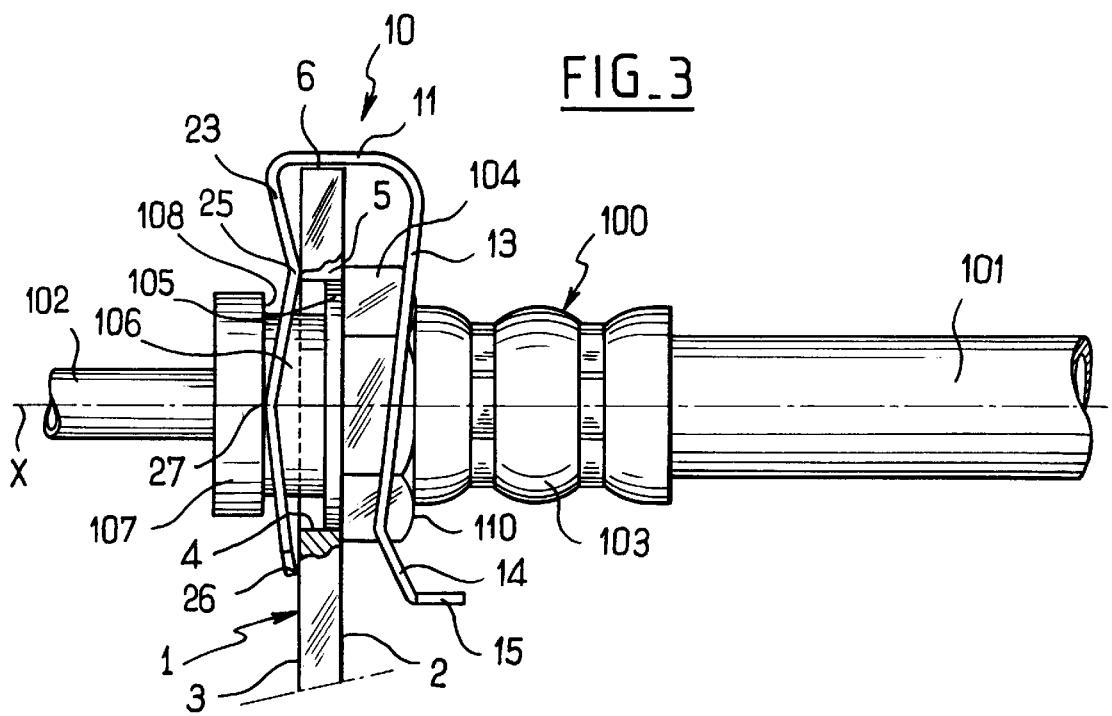

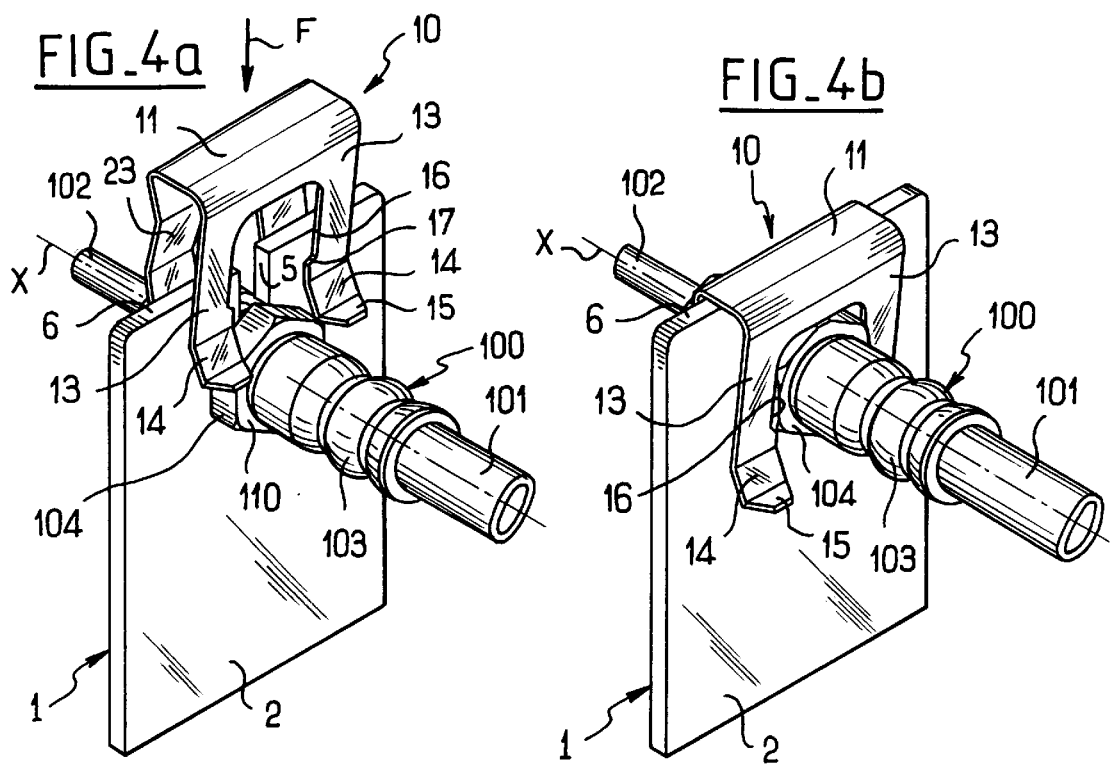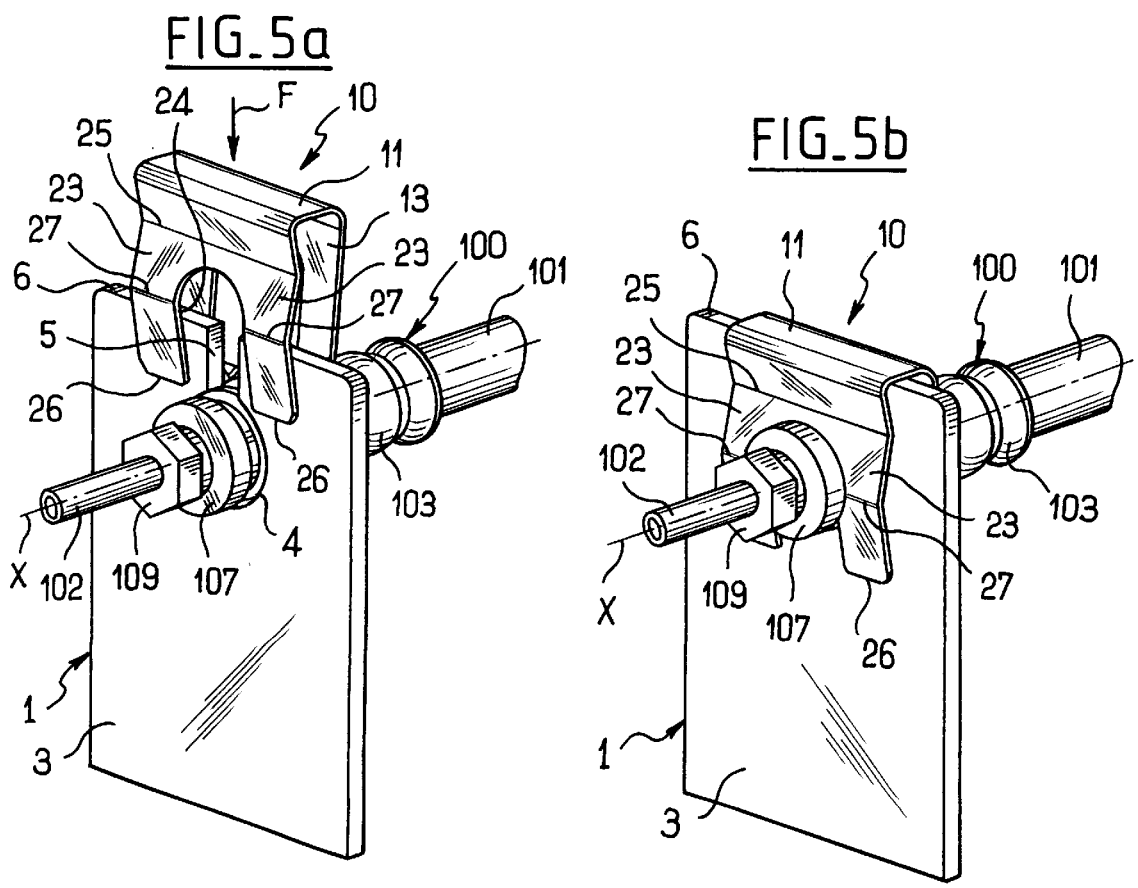

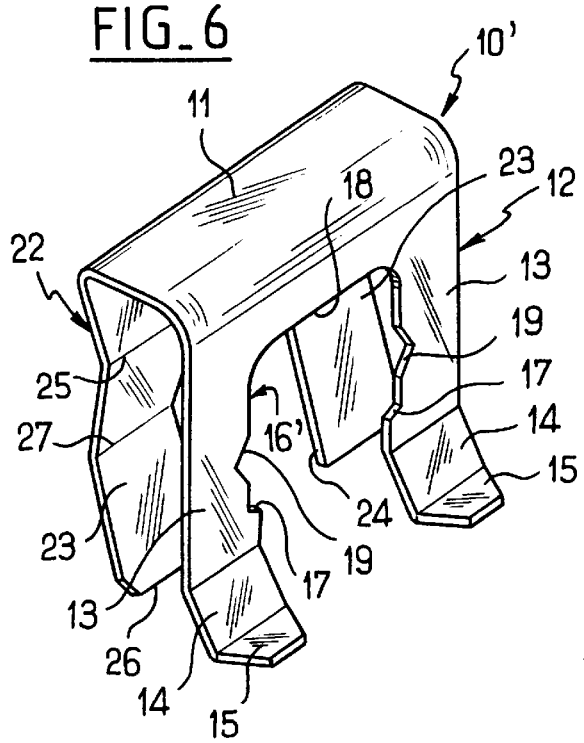
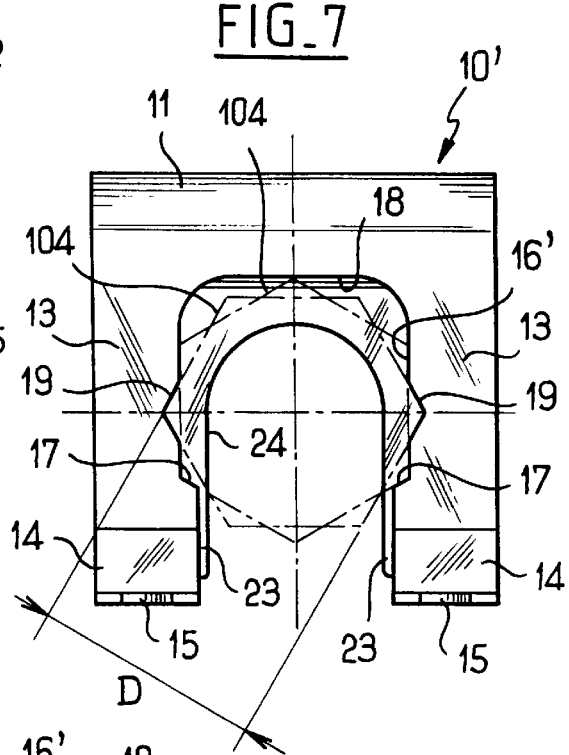
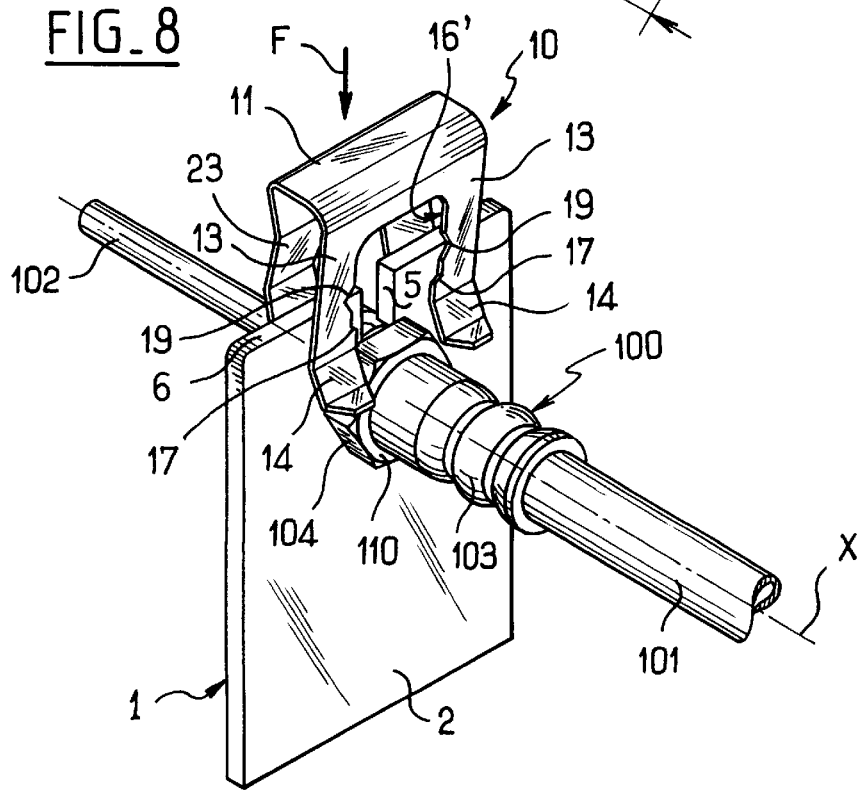

FASTENER DEVICE FOR HOLDING A TUBE JUNCTION MEMBER TO A PLATE THROUGH WHICH IT PASSES VIA AN ASSOCIATED OPENING

The invention relates to a fastener device for holding a tube junction member to a plate through which it passes via an associated opening.

BACKGROUND OF THE INVENTION

A typical field of application is that of the motor industry, where the plate is a web secured to the bodywork of the vehicle, and the tube junction member is, for example, a rigid junction between a flexible hose and a rigid tube in a brake line. Nevertheless, such an application merely constitutes an example, and the invention is not limited to that type of fastening.

It is desirable for tube junction members to be fastened so that they are held in place as reliably as possible, even when the support plate is subjected to shock and/or vibration. Thus, the present trend is more and more to providing a fastening capable of simultaneously locking the tube relative to the plate through which it passes, both against translation and against rotation.

In general, the tube junction member that needs to be held to a plate bears against a stop face of the plate via a polygonal element analogous to a nut, and it extends beyond said plate in the form of a portion passing through the opening in the plate.

Numerous solutions have already been proposed for making such fastenings, particularly in the motor industry.

Thus, a technique that has been known for 50 or more years consists in using on the side of the plate remote from the stop face against which the junction member bears, a staple in the form of a fork having two branches with curved central portions bearing against an end shoulder on the junction member so as to urge said junction member against the stop face of the plate, thus locking the junction member in translation, while also providing the stop face of the plate with projecting locking studs which co-operate with the polygonal element of the junction member. For example, with a hexagonal element, it is possible to use a set of four studs disposed in a square, thereby locking the member against rotation. The staple is hammered in to place so as to lock the junction member once it has been installed. Nevertheless, that technique suffers from certain drawbacks, including the hammering-in step which generally violates manufacturing rules in the motor vehicle industry, and the need to provide projecting studs on a plate which requires a cold embossing step.

Various other spring clip type fastener devices designed to bear against a face of the plate and against a shoulder of the junction member are also known. Those devices make it easy to lock the junction member against translation, but they provide no anti-rotation function.

A system is also known which, instead of using projecting anti-rotation studs, makes use of a fluting arrangement, while on the other side of the plate it makes use of an omega-shaped spring element whose bent ends bear against the corresponding face of the plate and whose center has the endpiece of the junction member passing therethrough. Such an omega clip nevertheless suffers from major drawbacks, of which mention can be made of its difficulty of installation, given that the clip needs to be held during screw-tightening by exerting prestress on the clip before beginning the tightening operation, and of the way in which the omega clip generates a traction force tending to pull the rigid tube away from the junction, thereby giving rise to forces that tend to spoil sealing at the junction. In addition, with such an omega clip, it is not possible to release the tube junction member from the plate without undoing the junction itself, which makes it necessary to drain the brake circuit of the vehicle, for example.

Mention may also be made of fastener devices implemented in the form of a pair of staples disposed on the same side of the plate, so as simultaneously to hold the junction member in translation and prevent the pair of staples being ejected, with the anti-rotation function still being performed in the same manner as in the above-mentioned example by studs or catches co-operating with the polygonal element of the junction member.

Finally, reference can also be made to the following documents: DE-A-44 38 057; GB-A-1 329 503; U.S. Pat. No. 5,272,934; and U.S. Pat. No. 4,621,839, which illustrate the technological background and which are described briefly below.

Document DE-A-44 38 057 describes a fastener device for fastening a ringed tube to the back wall of a machine structure in the field of domestic appliances. It merely comprises a clip enabling two ringed tubes to be clipped together before being put into place on the back wall.

Document GB-A-1 329 503 describes a clamp having two complementary jaws around one or two tubes at a flexible wire-passing bushing.

Document U.S. Pat. No. 5,272,934 describes a fastener device for cable control, with a fastening plate provided with lateral slideways for insertion into an open U-shaped notch.

Document U.S. Pat. No. 4,621,839 describes a ring for fastening the endpiece of a heat exchanger, which ring includes a projecting central rim.

OBJECTS AND SUMMARY OF THE INVENTION

An object of the invention is to provide a fastener of simple structure that is capable of simultaneously locking the junction member both in translation and against rotation.

Another object of the invention is to provide a fastener device which is easy to install or remove and which is capable of remaining in place reliably on the plate concerned.

According to the invention, this technical problem is solved by a fastener device for holding a tube junction member to a plate through which it passes via an associated opening, said junction member bearing against a stop face of the plate via a polygonal element analogous to a nut and extending beyond said plate by means of a portion passing through said opening, the fastener device being constituted by a rider for placing astride the plate so that a spine thereof presses against a free edge of the plate, said rider having, adjacent to the stop face, a first fork whose two branches define an internal outline designed to co-operate with the polygonal element of the junction member to prevent said junction member from rotating, and on the other side, it has a second fork whose two branches are placed astride the extension of the junction member, and are bent to bear against both the other face of the plate and against a terminal shoulder of said extension portion so as to urge the junction member against the stop face of the plate, thereby holding said junction member in translation.

Such a rider performs the anti-rotation function by means of the particular internal outline of the first fork of the rider and by means of the spine of said rider which bears against the free edge of the plate. Since the rider is designed to be placed astride the plate, its second fork serves only to hold the junction member in translation by blocking it so that it presses against said plate.

Preferably, the internal outline of the first fork of the rider has a step in each branch for co-operating with the polygonal element of the junction member to prevent ejection of the rider once installed.

It is also advantageous to provide for the internal outline of the first fork of the rider to have a notch in each branch designed to co-operate with the polygonal element of the junction member so as to simultaneously prevent said junction member from rotating and prevent the rider, once installed, from being ejected.

It is also possible to provide for the internal outline of the first fork of the rider to have, in each branch, both a step and a notch which are designed to produce two different angular indexing positions. In which case both the anti-rotation function and the anti-ejection function for the installed rider are both provided while still giving two different angular indexing positions.

Also advantageously, the branches of the first fork have outwardly sloping ends forming ramps that act, during installation of the rider, to co-operate with the outside face of the polygonal element of the junction member. Such a ramp makes it easier to install the rider, with the operator merely having to rotate the junction member about its own axis until the first fork of the rider snaps onto the polygonal element of said junction member. Preferably, it is possible to provide for each branch end to be terminated by an outwardly folded tab designed to facilitate extraction of the rider once it has been put into place.

Also advantageously, each branch of the second fork of the rider is bent in such a manner as to define two bearing points against the plate, plus central bearing point against the terminal shoulder of the junction member. In particular, when the rider is in place, the central bearing point of each of the branches of the second fork is level with the axis of the opening through the plate.

Finally, it is advantageous to provide for the rider to be made of spring steel.

BRIEF DESCRIPTION OF THE DRAWINGS

Other characteristics and advantages of the invention appear more clearly in the light of the following description and the accompanying drawings, relating to particular embodiments, and in which:

FIG. 1 is a perspective view of a fastener rider of the invention;

FIG. 2 is an end view of the FIG. 1 rider, wit chain-dotted lines showing the polygonal (hexagonal in this case) element that forms a portion of the junction member to be locked, thus illustrating the anti-rotation function performed by the rider, and also the anti-ejection function for a rider that is in place;

FIG. 3 is a side view of an assembly mounted on a plate, with the above-mentioned fastener rider serving to hold the junction member both against translation and against rotation;

FIGS. 4a and 4b are perspective views showing the above-mentioned rider being put into place as seen from the stop face side where the hexagonal element of the junction member presses against the plate;

FIGS. 5a and 5b shows the same steps of installing the rider as seen from the opposite side of the plate;

FIG. 6 is a perspective view showing a variant rider of the invention with an additional notch provided in each branch of the first fork, thereby providing two different angular indexing positions;

FIG. 7 is an end view similar to FIG. 2, showing the two possible positions for a hexagonal element that is locked against rotation between the two branches of the first fork; and FIG. 8 is a perspective view similar to FIG. 4a, showing the modified rider of FIGS. 6 and 7 being put into place.

MORE DETAILED DESCRIPTION

FIGS. 1 and 2 show a rider 10 having a spine 11 from which there project a first fork 12 and a second fork 22. The first fork 12 has two branches 13 leaving a central gap between them whose profile is defined by an internal outline referenced 16. This internal outline has a top edge 18, and in each of the two branches 13 it has a step 17 whose function is descried in greater detail below. It should be observed that each of the two branches 13 has an end 14 that slopes outwardly and that is terminated by a folded-out tab. The function of these details is likewise explained in greater detail below.

On the other side of the spine 11, the second fork 22 likewise has two branches 23 with an internal outline referenced 24, these two branches being bent, having two bend lines referenced 25 and 27, the free edges of the ends of the branches being referenced 26.

Before describing in greater detail and with reference to FIG. 2 the two functions performed by the two branches 13 of the first fork 12, it is appropriate to begin by describing the installed fastening as a whole as shown in FIG. 3.

In FIG. 3, there can be seen a junction member 100 that provides a connection between a flexible hose 101 and a rigid tube 102, the overall axis being referenced X. In this case, the junction member 100 is of the crimped junction type, having in succession: a compressed portion 103; a polygonal element 104 analogous to a nut, which portion is hexagonal in this case; a smooth cylindrical portion 105; a smaller-diameter cylindrical portion 106; and finally a cylindrical portion 107 of larger diameter than the preceding portion and defining a stop shoulder referenced 108. Although the tube junction member shown is entirely conventional, it should be understood that the invention is not limited to fastening a junction member of this type, and is applicable to other known types (not shown herein), providing they have a polygonal element analogous to a nut, and providing they extend beyond the plate in the form of a portion that passes through the opening in said plate.

The plate 1 has a stop face 2 and an opposite face referenced 3. A circular opening 4 allows a portion of the junction member to pass through, with the polygonal element 104 thereof then bearing against the stop face 2 of said plate. Specifically, the opening 4 is extended upwards by a notch 5 which opens out in the top edge 6 of the plate 1. When such a notch 5 is present, the two assembled-together tubes can be removed together with the junction member by passing the rigid tube through the notch. It should be observed that such withdrawal is possible with the rider of the invention, without there being any need to disassemble the junction, whereas that is not possible using a prior-art omega clip. If there is no such notch, then the assembly can be removed only by pulling in the opposite direction to the direction in which it bears against the face of the plate.

In FIG. 3, the above-described rider 10 is shown in the installed position, and it can be seen that the spine 11 of the rider then bears against the top edge 6 of the plate 1, which edge is rectilinear in this case. It is important to observe that the rider 10 is astride the plate 1 when said rider is in place.

The first fork 12 overlies the stop face side 2 of the plate 1, and its two branches 13 are astride the polygonal element 104 (hexagonal in this case) with the two parallel opposite rectilinear edges of the outline 16 being in contact with the two parallel faces of the hexagonal element 104. Any tendency of the junction member to rotate about its axis has the effect of transmitting torque to the rider 10, which torque is opposed by the spine 11 of said rider being in abutment against the top edge 6 of the plate 1. In this context, the edge of the plate against which the spine bears must be of a shape that is appropriate for applying the necessary force to the spine of the rider: the bearing edge may thus be rectilinear, as shown, or it may include bearing projections. The above-mentioned anti-rotation function is thus provided by the internal outline 16 of the first fork 12 which is shaped to co-operate with the hexagonal element 104 of the junction member 100 in order to lock said junction member against rotation.

On the other side, the second fork 22 has its two branches 23 astride the smallest-diameter cylindrical portion 106, and when it is in place, it can be seen that each of its branches 23 is specially bent to bear both against the face 3 of the plate 1 and against the terminal shoulder 108 of the extension portion, thereby urging the junction member 100 against the stop face 2 of the plate 1, and thus holding said junction member in translation. Specifically, each branch 23 of the second fork 22 of the rider 10 is bent in such a manner as to bear against the plate in two places and to bear centrally against the terminal shoulder 108 of the junction member 100. This is defined by a first bend line 25 corresponding to a first point for bearing against the face 3 of the plate 1, and a second line 27 corresponding to the central region bearing against the terminal shoulder 108, with the other bearing point against the face 3 being provided in this case by the end edge 26 of each branch 23.

Returning now to FIG. 2, it can be seen that each branch 13 of the first fork 12 has a step 17 in its internal outline, thereby shaping it to co-operate with the hexagonal element 104 of the junction member 100 so as to prevent the rider 10 from being ejected once it has been put into place. Specifically, the step 17 constitutes a transition between two parallel rectilinear portions, thereby defining a central gap in its widest portion that is of a width that matches the dimension D of the hexagonal element 104, and with a narrower opening of width d that is sufficient to pass on either side of the compressed portion 103 of the junction member.

The rider 10 as shown thus performs three functions, namely: it holds the junction member both against translation and against rotation, and it holds itself, once in place, against ejection.

As mentioned above, the branches 13 of the first fork 12 have outwardly sloping ends 14. These sloping ends 14 constitute ramps that act during installation of the rider 10 by co-operating with the outside face 110 of the polygonal element 104 of the junction member 100. This will be better understood in the light of the following explanations given with reference to FIGS. 4a and 4b.

In FIG. 4a, the rider 10 of the above-specified type is put into place over the junction member 100 which has already been installed in the opening of the plate 1. The branches 13 and 23 of the rider 10 are already located on opposite sides of the plate so that the rider is astride the plate. When the rider 10 is pushed towards the junction member, in the direction of arrow F, the sloping ends 14 slide over the outside face 110 of the hexagonal element 104. The operator needs only to push the rider 10 by hand until the spine 11 of the rider comes into contact with the top edge 6 of the plate 1, and thereafter, if necessary, to rotate the tubular assembly about the axis X so as to bring the hexagonal element 104 into its indexing position by snapping into the position in which the two branches 13 overlie respective opposite faces and their steps 17 engaged beneath said faces, as shown in FIG. 3. For this purpose, it is advantageous for the rider 10 to be made of spring steel so that the branches 13 are naturally resilient and tend to move back towards the plate 1 as soon as the indexing position is reached, thereby automatically completing both the anti-rotation function and the anti-ejection locking function.

FIGS. 5a and 5b show the same operation of putting the rider into place, but seen from the other side of the plate. It can be seen that the two branches 23 of the second fork 22 come astride the smallest-diameter portion of the junction member 100, and bear via lines 25 and 26 against the face 3 of the plate 1, and via lines 27 against the shoulder defined by the larger-diameter portion 107. In FIGS. 5a and 5b, a terminal fastening nut 109 is shown in association with the junction member 100, but that is merely by way of illustrative example.

In the installed position, the junction member is thus reliably held both against rotation and against translation relative to the support plate. This fastening withstands shock and vibration well, thereby making it most advantageous for use in the motor industry.

A variant rider is described below with reference to FIGS. 6 to 8.

The rider 10' shown in FIGS. 6 to 8 has many elements that are identical to the above-described rider 10, which elements are given the same references and are not described again. The rider 10' differs from the above-described rider 10 solely by a different internal outline 16' as defined by the two branches 13 of its first fork 12. In each branch 13, this internal outline 16' has a notch 19 which is organized to co-operate with the polygonal element 104 of the junction member 100 both for the purpose of preventing said junction member rotating and for the purpose of preventing the rider 10' being ejected after it has been put into place. Specifically, for a polygonal element 104 that is hexagonal, each notch 19 is constituted by two lengths at an angle of 120° so as to receive two opposite corners of the hexagonal element 104. Such a notch 19 thus acts simultaneously to prevent rotation and to prevent the installed rider from being ejected.

In the embodiment shown, it can be seen that the rider 10' also has a step 17 in each of its branches 13 as described above. In this case, with a step 17 between two parallel rectilinear lengths, two angular indexing positions are obtained as shown in FIG. 7. In the second indexing position, corresponding to that of the above-described rider 10, it is the steps 17 that perform the function of preventing the installed rider being ejected.

The rider 10' is put into place in exactly the same manner as the above-described rider 10, and FIG. 8 shows the rider being put into place on the plate 1.

In both cases, the branch ends 14 are terminated by outwardly-folded tabs 15. These tabs make it easier to extract a rider 10 or 10'. By taking hold of the two branches 13 via their projecting tabs 15, it is possible to deform said branches elastically until they can slide over the outside face 110 of the polygonal element 104, thereby overcoming the anti-ejection function, and enabling the rider 10 or 10' to be removed from the plate 1.

As can be seen more clearly in FIG. 3, which applies equally well to the rider 10 and to the rider 10', when the rider is in place, the central bearing points 27 of the branches 23 of the second fork 22 are level with the axis X of the opening 4 through the plate 1. Thus, the thrust force exerted on the shoulder 108 does not generate any force tending to displace the junction member relative to the axis X of the opening 4, with the junction member being centered by the cylindrical portion 105 which is received in the opening 4.

Naturally, the invention is not limited to the embodiments described above, but on the contrary covers any variant using equivalent means to reproduce the essential characteristics specified above.

In particular, the shape of the polygonal element could be replaced by any other non-circular shape, e.g. oval, elliptical, or rectangular with two projecting semicircles, the internal outline of the first fork of the rider then having a complementary shape for obtaining the desired anti-rotation function and possibly also the function of preventing the installed rider from being ejected.

I claim:

1. A fastener device for holding a tube junction member to a plate through which it passes via an associated opening, the plate having a free edge, said junction member bearing against a stop face of the plate via a polygonal element analogous to a nut and extending beyond said plate by means of a portion passing through said opening, wherein the fastener device is constituted by a rider for placing astride the plate and having a spine thereof which presses against the free edge of the plate, said rider having, adjacent to the stop face, a first fork whose two branches define an internal outline designed to co-operate with the polygonal element of the junction member to prevent said junction member from rotating, and on the other side, it has a second fork whose two branches are placed astride the extension of the junction member, and are bent to bear against both the other face of the plate and against a terminal shoulder of said extension portion so as to urge the junction member against the stop face of the plate, thereby holding said junction member in translation.

2. A device according to claim 1, wherein the internal outline of the first fork of the rider has a step in each branch for co-operating with the polygonal element of the junction member to prevent ejection of the rider once installed.

3. A device according to claim 1, wherein the internal outline of the first fork of the rider has a notch in each branch designed to co-operate with the polygonal element of the junction member so as to simultaneously prevent said junction member from rotating and prevent the rider, once installed, from being ejected.

4. A device according to claim 1, in which the internal outline of the first fork of the rider has, in each of its branches, both a step and a notch, each designed to co-operate with the polygonal element of the junction member to prevent the rider being ejected once installed, and defining two different angular indexing positions for the polygonal element of the junction member.

5. A device according to claim 1, wherein the branches of the first fork have outwardly sloping ends forming ramps that act, during installation of the rider, to co-operate with the outside face of the polygonal element of the junction member.

6. A device according to claim 5, wherein each branch end is terminated by an outwardly folded tab designed to facilitate extraction of the rider once it has been put into place.

7. A device according to claim 1, wherein each branch of the second fork of the rider is bent in such a manner as to define two bearing points against the plate, plus a central bearing point against the terminal shoulder of the junction member.

8. A device according to claim 7, wherein, when the rider is in place, the central bearing point of each of the branches of the second fork is level with the axis of the opening through the plate.

9. A device according to claim 1, wherein the rider is made of spring steel.

* * * * *